United States Patent
Odate

(10) Patent No.: US 9,950,698 B2
(45) Date of Patent: Apr. 24, 2018

(54) VEHICLE BRAKE SYSTEM

(71) Applicant: HONDA MOTOR CO., LTD., Tokyo (JP)

(72) Inventor: Shotaro Odate, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/138,924

(22) Filed: Apr. 26, 2016

(65) Prior Publication Data

US 2016/0311414 A1 Oct. 27, 2016

(30) Foreign Application Priority Data

Apr. 27, 2015 (JP) .................... 2015-090271

(51) Int. Cl.
| | | |
|---|---|---|
| *B60T 7/22* | (2006.01) | |
| *B60T 8/58* | (2006.01) | |
| *B60T 8/1755* | (2006.01) | |
| *B60T 8/40* | (2006.01) | |

(52) U.S. Cl.
CPC ............ *B60T 7/22* (2013.01); *B60T 8/17558* (2013.01); *B60T 8/58* (2013.01); *B60T 8/4081* (2013.01); *B60T 2201/024* (2013.01)

(58) Field of Classification Search
CPC ........ B60T 7/22; B60T 8/172; B60T 8/17558; B60T 8/58; B60T 2201/022; B60T 2201/024; B60T 2201/03
See application file for complete search history.

(56) References Cited

U.S. PATENT DOCUMENTS

| | | | | |
|---|---|---|---|---|
| 2002/0011373 A1* | 1/2002 | Wielenga | ............... | B60K 28/14 180/275 |
| 2009/0082949 A1* | 3/2009 | Petrie | ........................ | B60T 7/22 701/119 |
| 2010/0114467 A1* | 5/2010 | Samuel | .................. | G08G 1/164 701/119 |
| 2013/0151085 A1* | 6/2013 | Roth | ..................... | B60W 10/18 701/48 |
| 2015/0274145 A1* | 10/2015 | Ando | ........................ | B60T 7/22 701/70 |
| 2015/0360655 A1* | 12/2015 | Odate | ....................... | B60T 7/22 701/70 |
| 2016/0023655 A1* | 1/2016 | Makino | ............... | B60W 10/184 701/37 |

FOREIGN PATENT DOCUMENTS

| | | | |
|---|---|---|---|
| JP | 06286559 | * | 10/1994 |
| JP | 2012-1091 A | | 1/2012 |

* cited by examiner

*Primary Examiner* — Vishal R Sahni
(74) *Attorney, Agent, or Firm* — Westerman, Hattori, Daniels & Adrian, LLP

(57) ABSTRACT

A vehicle brake system includes a collision state determination section and a second brake controller. The collision state determination section determines a collision state of a vehicle. The second brake controller performs control of braking on the vehicle irrespective of braking operation by a driver in cases where it has been determined by the collision state determination section that the vehicle has collided. When it has been determined by the collision state determination section that the vehicle has been involved in a multiple collision, the second brake controller increases the braking control amount in such situations compared to a braking control amount during a single collision.

3 Claims, 5 Drawing Sheets

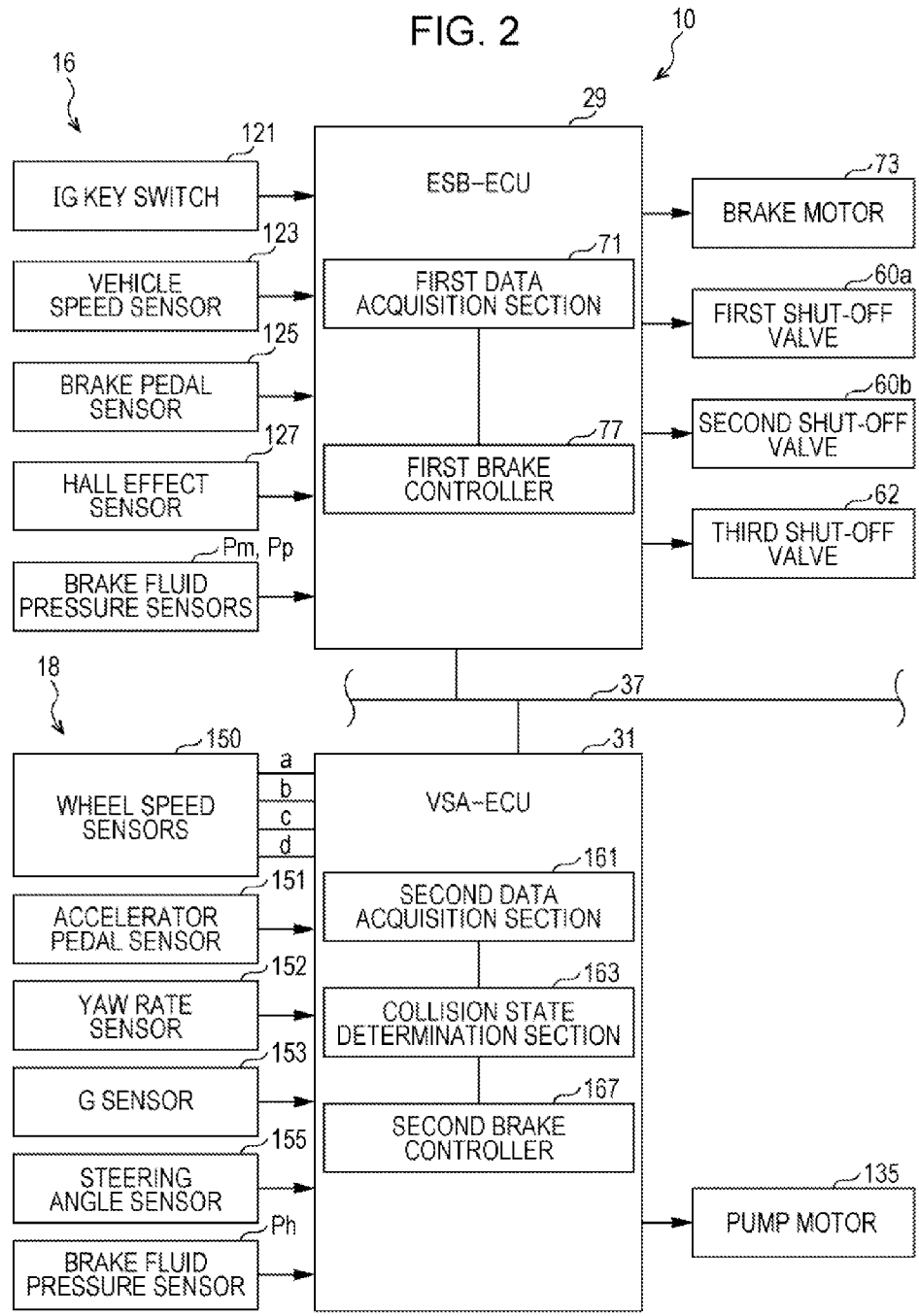

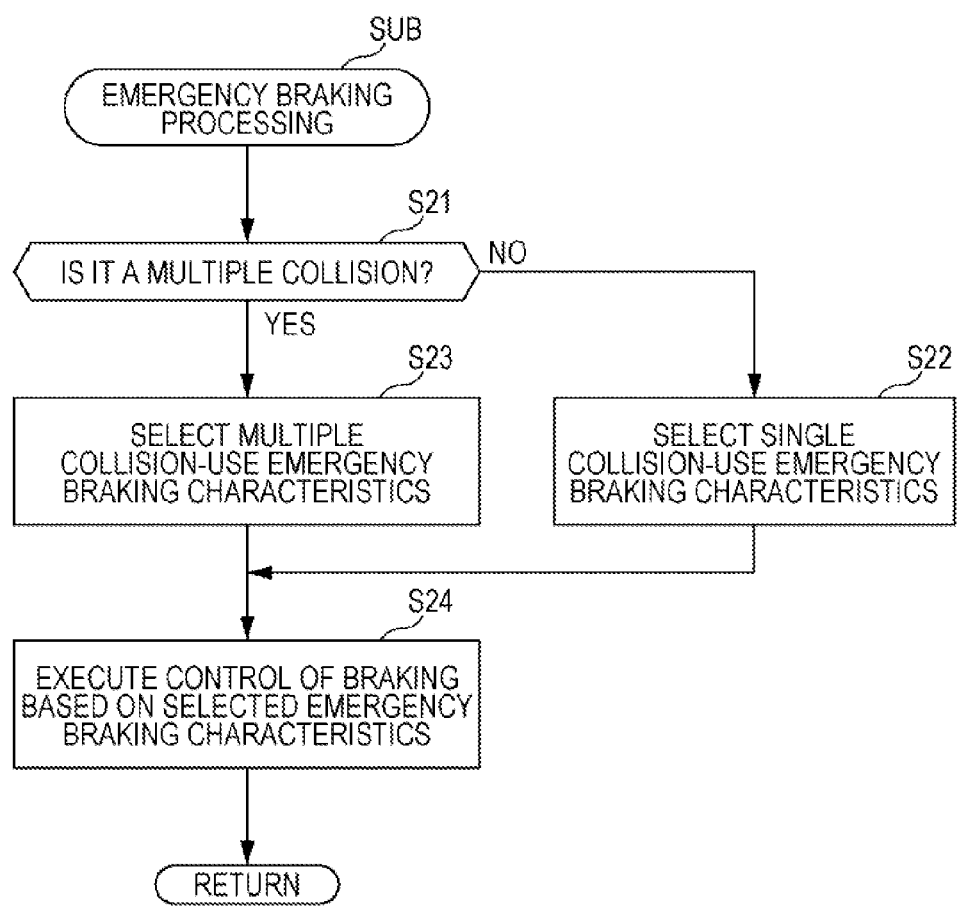

VEHICLE BRAKE SYSTEM

CROSS REFERENCES TO RELATED APPLICATIONS

The present application claims priority under 35 U.S.C. § 119 to Japanese Patent Application No. 2015-090271, filed Apr. 27, 2015, entitled "Vehicle Brake System." The contents of this application are incorporated herein by reference in their entirety.

BACKGROUND

1. Field

The present disclosure relates to a vehicle brake system for braking a vehicle.

2. Description of the Related Art

Japanese Unexamined Patent Application Publication No. 2012-001091 describes an example of a vehicle brake system for braking a vehicle. The vehicle brake system according to Japanese Unexamined Patent Application Publication No. 2012-001091 is equipped with a collision sensor for detecting a collision of the vehicle and a vehicle speed sensor for detecting vehicle speed of the vehicle. When a collision of the vehicle is detected by the collision sensor, an automatic braking period, this being a period during which braking force is generated automatically, is controlled based on vehicle speed detected by the vehicle speed sensor after the collision has been detected, and a brake controller is operated.

The vehicle brake system according to Japanese Unexamined Patent Application Publication No. 2012-001091 enables the automatic braking period to be made a length of time appropriate to the type of collision, due to controlling the automatic braking period based on the vehicle speed after collision detection.

However, the vehicle brake system according to Japanese Unexamined Patent Application Publication No. 2012-001091 does not consider multiple collisions in which the vehicle collides with objects on multiple occasions. There is accordingly a concern that appropriate braking is not performable when the vehicle has been involved in a multiple collision accident.

SUMMARY

In consideration of the above circumstances, the present application describes the provision of a vehicle brake system capable of executing accurate control of braking on a vehicle when the vehicle has been involved in a multiple collision accident.

A first aspect of the present application is a vehicle brake system for braking a host vehicle. The vehicle brake system includes a collision state determination section that determines a collision state of a vehicle in which the host vehicle currently involves a collision event, and a brake controller that performs control of braking on the vehicle irrespective of braking operation by a driver in cases where it has been determined by the collision state determination section that the vehicle has collided. When it has been determined by the collision state determination section that the vehicle has been involved in a multiple collision having plural collision events, which typically indicates that two or more collation events occur at a time or at the same time, the brake controller increases the braking control amount in such situations compared to a braking control amount during a single collision having a single collision event.

In the first aspect of the present application, when it has been determined by the collision state determination section that the vehicle has been involved in a multiple collision, the brake controller increases the braking control amount in such situations compared to a braking control amount during a single collision. Thus control of braking on the vehicle can be accurately accomplished when the vehicle has been involved in a multiple collision. As a result, the first aspect of the present application can be expected to be effective in reducing or avoiding further collision damage after being involved in a multiple collision accident.

A second aspect of the present application is the vehicle brake system according to the first aspect, further including a vehicle speed detection section that detects the speed of the vehicle. During the single collision, the brake controller performs control of braking on the vehicle employing a braking control amount according to the vehicle speed during the single collision. During the multiple collision, the brake controller performs control of braking on the vehicle employing a specific braking control amount irrespective of the vehicle speed during the multiple collision.

Since, in a single collision, there is a concern that a vehicle behind might run into the vehicle itself, it is generally surmised to be preferable to perform control of braking on the vehicle itself using a braking control amount according to the vehicle speed during a single collision. In contrast thereto, since deterioration in the detection precision for vehicle speed is assumed during a multiple collision, it is surmised to be preferable to perform control of braking on the vehicle itself using the specific braking control amount, irrespective of the vehicle speed during the multiple collision.

In the second aspect of the present application, the brake controller performs control of braking on the vehicle during a single collision using the braking control amount according to the vehicle speed during a single collision, but performs control of braking on the vehicle during a multiple collision using the specific braking control amount, irrespective of the vehicle speed during the multiple collision.

Due to being able to accurately accomplish control of braking on the vehicle when the vehicle has been involved in a multiple collision accident, similarly to the first aspect of the present application, the second aspect of the present application can be expected to be effective in reducing or avoiding further collision damage after being involved in a multiple collision accident. The word "section" used in this application may mean a physical part or component of computer hardware including a controller, a processor, a memory, etc., which is configured to perform intended functions.

The vehicle brake system based on the present application is capable of executing accurate control of braking on the vehicle when the vehicle has been involved in a multiple collision accident.

BRIEF DESCRIPTION OF THE DRAWINGS

FIG. 2 is a block diagram illustrating peripheral configuration to an ESB-ECU and a VSA-ECU of a vehicle brake system.

FIG. 3B is a flowchart describing the operation of a vehicle brake system.

DESCRIPTION OF THE PREFERRED EMBODIMENTS

Figure 1:
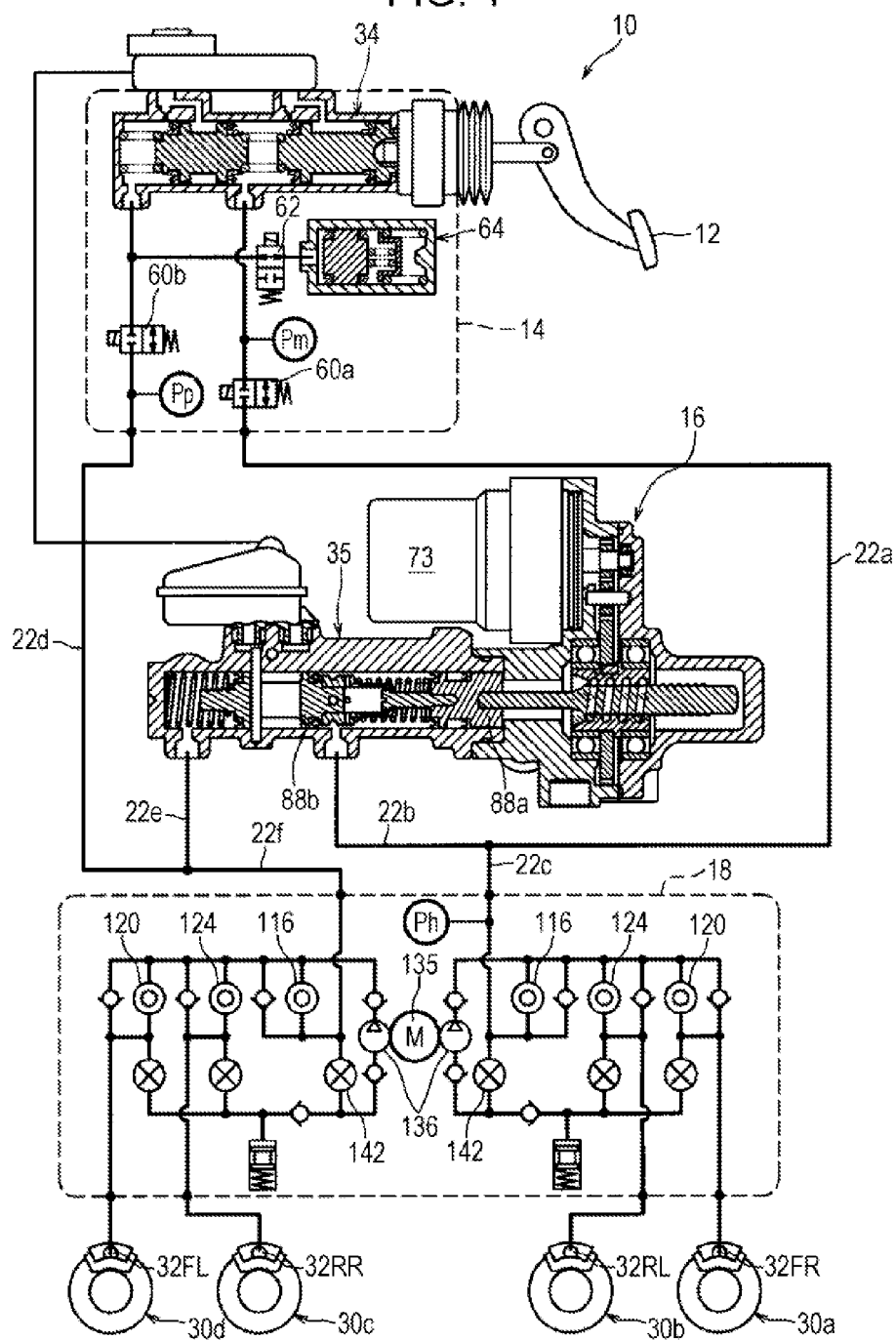
FIG. 1 is a configuration diagram illustrating an overview of a vehicle brake system according to an embodiment of the present application.

Detailed explanation follows regarding a vehicle brake system 10 according to an embodiment of the present application, with reference to the drawings.

In the drawings referred to below, members having common functions, and members having mutually corresponding functions, are normally appended with commom reference numerals to each other. Moreover, the size and shape of members is sometimes schematically distorted or exaggerated for ease of explanation.

Overview of the Vehicle Brake System 10 According to an Embodiment of the Present Application The vehicle brake system 10 according to an embodiment of the present application is equipped with a by-wire braking system that generates braking force through an electrical system, in addition to an existing braking system that generates braking force through a hydraulic system.

The vehicle brake system 10 is, as illustrated in FIG. 1, configured including a primary hydraulic pressure generator 14, an electrical servo brake system 16 (hereinafter referred to as the ESB system 16), and a vehicle behavior stabilization assistance system 18 (hereinafter referred to as the VSA system 18). The primary hydraulic pressure generator 14, the ESB system 16, and the VSA system 18 are, as illustrated in FIG. 1, connected to each other via pipes 22a to 22f so as to enable brake fluid to flow therebetween.

The primary hydraulic pressure generator 14 converts a pedal force input by driver operation of a brake pedal 12 into a brake fluid pressure (primary hydraulic pressure). The primary hydraulic pressure generator 14 is, as illustrated in FIG. 1, configured including a master cylinder 34, a first shut-off valve 60a, a second shut-off valve 60b, a pair of brake fluid pressure sensors Pm, Pp, and a stroke simulator 64.

The master cylinder 34 converts the pedal force input by driver operation of the brake pedal 12 into a brake fluid pressure. During normal operation of the vehicle brake system 10, the first shut-off valve 60a and the second shut-off valve 60b shut off communication between the master cylinder 34 and disk brake mechanisms 30a to 30d (including wheel cylinders 32FR, 32RL, 32RR, and 32FL) that brake each of the four wheels, such that the disk brake mechanisms 30a to 30d are operated by utilizing the brake fluid pressure generated by the ESB system 16. In the following explanation, reference will be made to wheel cylinders 32 when collectively referring to the wheel cylinders 32FR, 32RL, 32RR, and 32FL.

The pair of brake fluid pressure sensors Pm, Pp include a function to detect brake fluid pressure generated by the master cylinder 34. The stroke simulator 64 performs the role of absorbing the brake fluid pressure generated by the master cylinder 34 in a state in which the first shut-off valve 60a and the second shut-off valve 60b are shut off and a third shut-off valve 62 has been opened, for example when the ESB system 16 has fallen into an abnormal state.

The ESB system 16 includes a function for generating brake fluid pressure (secondary hydraulic pressure) either according to the brake fluid pressure generated by the master cylinder 34, or irrespective of the brake fluid pressure generated by the master cylinder 34. The ESB system 16 is, as illustrated in FIG. 1, configured including a brake motor 73, and first and second slave pistons 88a, 88b. The first and second slave pistons 88a, 88b perform the role of receiving the rotational drive force from the brake motor 73, and generating brake fluid pressure.

The VSA system 18 includes: an ABS function to prevent wheel lock during braking; a traction control system (TCS) function to prevent wheel spin during acceleration, for example; a function to suppress sideways drifting during turning, for example; and a function (described in detail below) to perform emergency braking control irrespective of driver brake operation either during a single collision, or a multiple collision of the vehicle (not illustrated in the drawings). In order to execute these various functions, the VSA system 18 assists in stabilizing vehicle behavior by adjusting the brake fluid pressure generated by the ESB system 16.

More specifically, the VSA system 18 is configured including a brake fluid pressure sensor Ph that detects the brake fluid pressure generated by a slave cylinder 35 of the ESB system 16, pressure pumps 136 that pressurize the brake fluid, and a pump motor 135 that drives the pressure pumps 136.

Note that a configuration including an ABS function alone may be employed as the VSA system 18.

The following procedure may be employed to adjust the VSA brake fluid pressure by operation of the VSA system 18. In a state in which suction valves 142 provided on a fluid supply path of the VSA system 18 have been excited and opened, the VSA system 18 first drives the pressure pumps 136 by employing the pump motor 135. Then the brake fluid that has been sucked in through the suction valves 142 and pressurised by the pressure pumps 136 is respectively supplied to regulator valves 116, first inner valves 120, and second inner valves 124.

By exciting the regulator valves 116, and adjusting the degree of opening the regulator valves 116, the VSA system 18 adjusts the VSA brake fluid pressure to a target hydraulic pressure, and supplies brake fluid adjusted to the target hydraulic pressure respectively through the opened first inner valves 120 and second inner valves 124, to the wheel cylinders 32FR, 32RL, 32RR, and 32FL. The VSA system 18 thereby controls braking force on the four wheels to a braking force corresponding to that of the target hydraulic pressure, even in a state in which the driver is not operating the brake pedal 12.

Other elements in FIG. 1 are not directly related to the present application, and so explanation is omitted thereof.

Basic Action of the Vehicle Brake System 10

Next, explanation follows regarding basic action of the vehicle brake system 10.

In the vehicle brake system 10, during normal operation of an ESB-ECU 29 (see FIG. 2), described later, that controls the ESB system 16, what is referred to as a by-wire braking system is active when a driver presses the brake pedal 12.

More specifically, during normal operation of the vehicle brake system 10, when the driver presses the brake pedal 12, the first shut-off valve 60a and the second shut-off valve 60b are in a shut off state whereas the third shut-off valve 62 is in an open state, and the brake fluid pressure (secondary hydraulic pressure) generated by the ESB system 16 is employed to operate the disk brake mechanisms 30a to 30d.

When this is performed, the brake fluid flows from the master cylinder 34, through the third shut-off valve 62, and into the stroke simulator 64. A flow of brake fluid from the master cylinder 34 to the stroke simulator 64 thereby occurs even though the first shut-off valve 60a and the second shut-off valve 60b are shut-off, and so the brake pedal 12 moves by a stroke.

However, in the vehicle brake system 10, when, for example, the ESB system 16 has fallen into an abnormal state, the existing hydraulic braking system is active when the driver presses the brake pedal 12. More specifically, in the vehicle brake system 10 in an emergency, the first shut-off valve 60a and the second shut-off valve 60b are in an open state, and the third shut-off valve 62 is in a closed state when the driver presses the brake pedal 12. The brake fluid pressure generated by the master cylinder 34 is accordingly transmitted to the wheel cylinders 32FR, 32RL, 32RR, and 32FL of the disk brake mechanisms 30a to 30d, operating the disk brake mechanisms 30a to 30d.

Peripheral Configuration to the ESB-ECU 29 and a VSA-ECU 31 of the Vehicle Brake System 10

Next, explanation follows regarding peripheral configuration to the ESB-ECU 29 and a VSA-ECU 31 of the vehicle brake system 10 according to the embodiment of the present application, with reference to FIG. 2. FIG. 2 is an explanatory diagram illustrating peripheral configuration to the ESB-ECU 29 and the VSA-ECU 31 of the vehicle brake system 10.

The ESB-ECU 29 and the VSA-ECU 31 are connected together so as to enable the mutual exchange of data through, for example, a CAN communication vehicle 37, as illustrated in FIG. 2.

The CAN communication vehicle 37 is a multiplexed serial communications network generally employed for data communication between on-board devices. The CAN communication vehicle 37 has excellent data transmission speeds and error detection capabilities. It should, however, be noted that there is no limitation to employing the CAN communication vehicle 37 as the "data communication vehicle" employed in the embodiment of the present application. For example, FlexRay (registered trademark) may be employed as the "data communication vehicle" employed in the embodiment of the present application.

Configuration of ESB-ECU 29

As illustrated in FIG. 2, as an input system, an ignition key switch 121 (hereinafter referred to as IG key switch 121), a vehicle speed sensor 123, a brake pedal sensor 125, a Hall effect sensor 127, and the brake fluid pressure sensors Pm, Pp, are respectively connected to the ESB-ECU 29.

The ignition key switch 121 is a switch operated to supply power to each electrical component installed to the vehicle using an on-board battery (not illustrated in the drawings). When the ignition key switch 121 is switched ON, power is supplied to the ESB-ECU 29, the VSA-ECU 31, and a BODY-ECU 33, and the ESB-ECU 29, the VSA-ECU 31, and the BODY-ECU 33 are actuated.

The vehicle speed sensor 123 has a function to detect the vehicle travelling speed (vehicle speed) V. Data regarding the vehicle speed V detected by the vehicle speed sensor 123 is sent to the ESB-ECU 29.

The brake pedal sensor 125 has a function to detect an operation amount (stroke amount) and torque exerted by the driver on the brake pedal 12. Data regarding operation amount and torque on the brake pedal 12 detected by the brake pedal sensor 125 is sent to the ESB-ECU 29.

The Hall effect sensor 127 has a function to detect the rotation angle of the brake motor 73 (data regarding the current placement along the axial direction of the slave pistons 88a, 88b). The data regarding the rotation angle of the brake motor 73 detected by the Hall effect sensor 127 is sent to the ESB-ECU 29.

The brake fluid pressure sensors Pm, Pp have functions to detect, respectively, the upstream side hydraulic pressure of the first shut-off valve 60a and the downstream side hydraulic pressure of the second shut-off valve 60b in the braking hydraulic pressure system. Hydraulic pressure data detected by the brake fluid pressure sensors Pm, Pp for each section of the braking hydraulic pressure system is sent to the ESB-ECU 29.

As illustrated in FIG. 2, as an output system, the brake motor 73, and the first to third shut-off valves 60a, 60b, 62, are respectively connected to the ESB-ECU 29.

The ESB-ECU 29 is configured including a first data acquisition section 71, and a first brake controller 77, as illustrated in FIG. 2.

The first data acquisition section 71 has a function to acquire data such as data regarding ON/OFF operation of the ignition key switch 121, data regarding the vehicle speed V detected by the vehicle speed sensor 123, data regarding the amount and torque of braking detected by the brake pedal sensor 125, data regarding the rotation angle of the brake motor 73 detected by the Hall effect sensor 127, and data regarding the brake fluid pressure of each section detected by the brake fluid pressure sensors Pm, Pp.

The first data acquisition section 71 also has a function to acquire, over the CAN communication vehicle 37, collision state data regarding a collision state of the vehicle sent from the VSA-ECU 31 (including whether or not a collision has occurred, and, if a collision has occurred, whether it is a single collision or a multiple collision), and to acquire the hydraulic pressure data detected by the brake fluid pressure sensor Ph.

Basically, the first brake controller 77 has a function to, based on data acquired by the first data acquisition section 71 such as the data regarding braking and the data regarding the brake fluid pressure of each section, control the brake fluid pressure applied to the wheel cylinders 32, such that the brake fluid pressure generated by the ESB system 16 follows a target brake fluid pressure corresponding to the braking operation.

The first brake controller 77 also has a function to, when collision state data indicating that the vehicle has been involved in a single collision or multiple collision has been received, assist emergency braking control by the VSA system 18 by shutting off the first shut-off valve 60a and the second shut-off valve 60b, so as to interrupt the flow of brake fluid between the master cylinder 34 and the slave cylinder 35.

The ESB-ECU 29 is configured by a microcomputer including a central processing unit (CPU), read only memory (ROM), and random access memory (RAM). The microcomputer reads and executes programs and data stored in the ROM, and operates so as to perform execution control of various functions of the ESB-ECU 29. These functions include an acquisition function for various information including collision state data regarding the collision state of the vehicle, a control function for the brake fluid pressure applied to the wheel cylinders 32, and a function to assist emergency braking control by the VSA system 18.

Configuration of the VSA-ECU 31

As illustrated in FIG. 2, wheel speed sensors 150, an accelerator pedal sensor 151, a yaw rate sensor 152, a G sensor 153, a steering angle sensor 155, and the brake fluid pressure sensor Ph are respectively connected to the VSA-ECU 31.

The wheel speed sensors 150a to 150d each have a function to detect the respective rotation speed (wheel speed) for each wheel. Data regarding the rotation speed for each of the wheels, detected by the respective wheel speed sensors 150a to 150d, is sent to the VSA-ECU 31.

The accelerator pedal sensor 151 has a function to detect the operation amount (stroke amount) by the driver of the accelerator pedal. Data regarding the operation amount of the accelerator pedal detected by the accelerator pedal sensor 151 is sent to the VSA-ECU 31.

The yaw rate sensor 152 has a function to detect the yaw rate of the vehicle. Data regarding the yaw rate detected by the yaw rate sensor 152 is sent to the VSA-ECU 31.

The G sensor 153 has a function to detect the respective front-rear G (front-rear acceleration) and lateral G (lateral acceleration) on the vehicle. Data regarding the front-rear G and the lateral G detected by the G sensor 153 is sent to the VSA-ECU 31.

The steering angle sensor 155 has a function to detect the steering amount and steering direction of steering. Data regarding the steering angle of steering detected by the steering angle sensor 155 is sent to the VSA-ECU 31.

The brake fluid pressure sensor Ph has a function to detect brake fluid pressure occurring in the fluid feed path of the VSA system 18 in the brake fluid pressure system. Data detected by the brake fluid pressure sensor Ph about the hydraulic pressure in the fluid feed path of the VSA system 18 is sent to the ESB-ECU 29.

As illustrated in FIG. 2, as an output system, the pump motor 135 is connected to the VSA-ECU 31.

The VSA-ECU 31 is configured including a second data acquisition section 161, a collision state determination section 163, and a second brake controller 167.

The second data acquisition section 161 has a function to respectively acquire data regarding the rotation speeds (wheel speeds) of each of the wheels respectively detected by the wheel speed sensors 150a to 150d, data regarding the acceleration operation amount of the accelerator pedal detected by the accelerator pedal sensor 151, data regarding the yaw rate of the vehicle detected by the yaw rate sensor 152, data regarding the front-rear G and lateral G on the vehicle detected by the G sensor 153, data regarding the steering angle of steering detected by the steering angle sensor 155, and data regarding the hydraulic pressure in the fluid feed path of the VSA system 18 detected by the brake fluid pressure sensor Ph.

The collision state determination section 163 has a function to determine, based on data regarding the front-rear G and lateral G on the vehicle detected by the G sensor 153, a collision state of the vehicle (including whether or not it is a single collision or a multiple collision). In cases where at least one of the front-rear G or the lateral G has exceeded separately predetermined respective collision determination threshold values, the collision state determination section 163 determines that the vehicle has collided (determines a single collision the first time the front-rear G or lateral G has exceeded the respective collision determination threshold value).

The collision state determination section 163 determines that the vehicle has been involved in a multiple collision in cases where, after a single collision, at least one of the front-rear G or the lateral G has exceeded the respective collision determination threshold value prior to the elapse of a specific length monitoring period, starting at the point in time of the single collision. Note that a period of time of a suitable length to infer that a collision linked to the first collision (namely a multiple collision) has occurred may be appropriately set as the monitoring period.

Data of the determination result by the collision state determination section 163 is referenced, as appropriate, by the second brake controller 167, such as when determining whether or not operation of an emergency braking function is required.

Basically, the second brake controller 167 determines whether or not operation of the emergency braking function is required, based on the data of the determination result by the collision state determination section 163 regarding the collision state of the vehicle. When this determination result is determination that the vehicle has been involved in a single collision or multiple collision, the second brake controller 167 interprets this to mean that operation of the emergency braking function is required, and acts so as to perform control of braking on each of the wheels by using the VSA system 18 to exhibit a brake fluid pressure adjustment function.

More precisely, when determination has been made by the collision state determination section 163 that the vehicle has been involved in a multiple collision, the second brake controller 167 acts so as to increase the braking control amount in such situations compared to the braking control amount during a single collision. This is explained in more detail below. The second brake controller 167 corresponds to the "brake controller" of the present application.

The VSA-ECU 31 is configured by a microcomputer including a CPU, ROM, and RAM. This microcomputer reads and executes programs and data stored in the ROM, and acts so as to perform execution control of various functions of the VSA-ECU 31. These functions include a function to acquire various information including data regarding the front-rear G or lateral G, and data regarding the vehicle speed, and a function to perform emergency braking control using the VSA system 18 irrespective of braking operation by the driver when the vehicle is involved in a single collision or multiple collision.

Figure 3A:
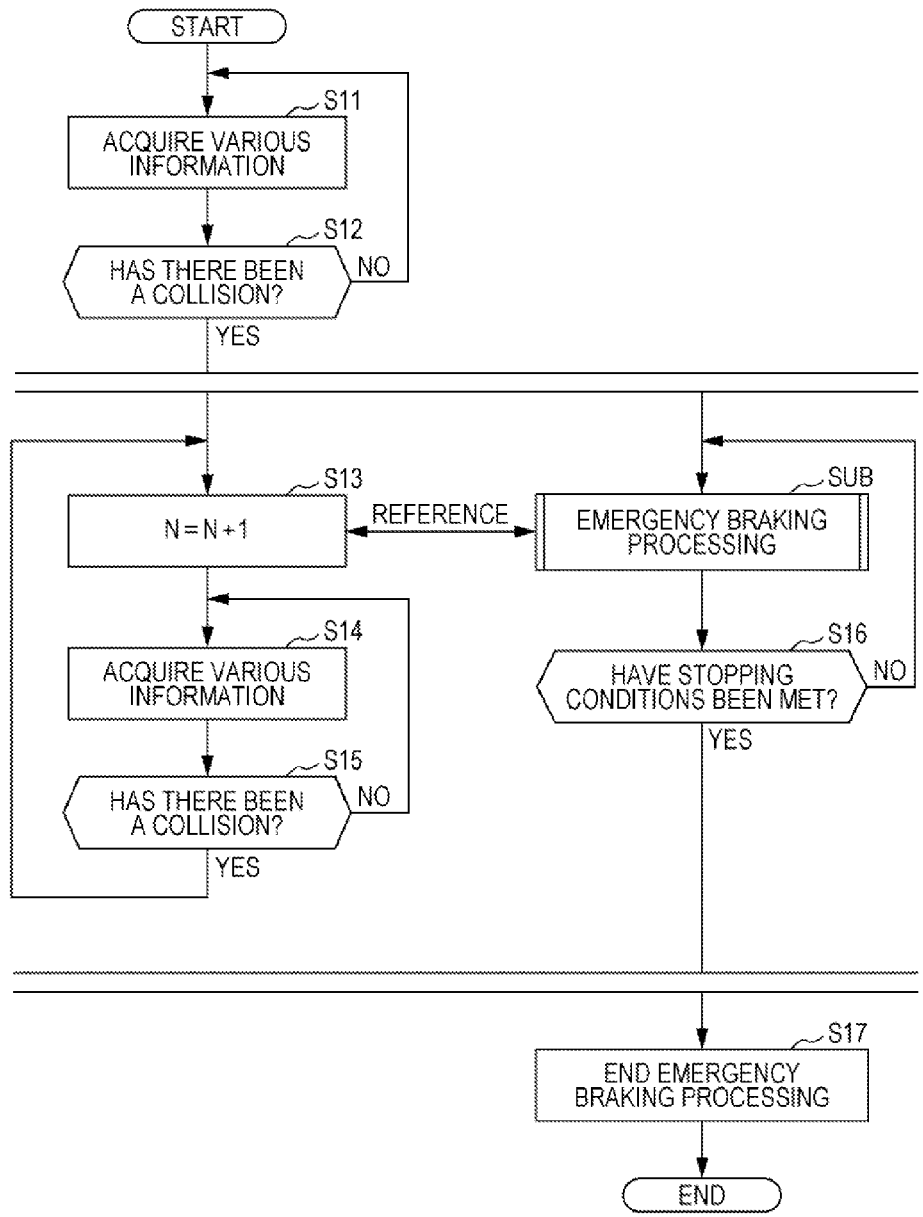
FIG. 3A is a flowchart describing the operation of a vehicle brake system.
Figure 4:
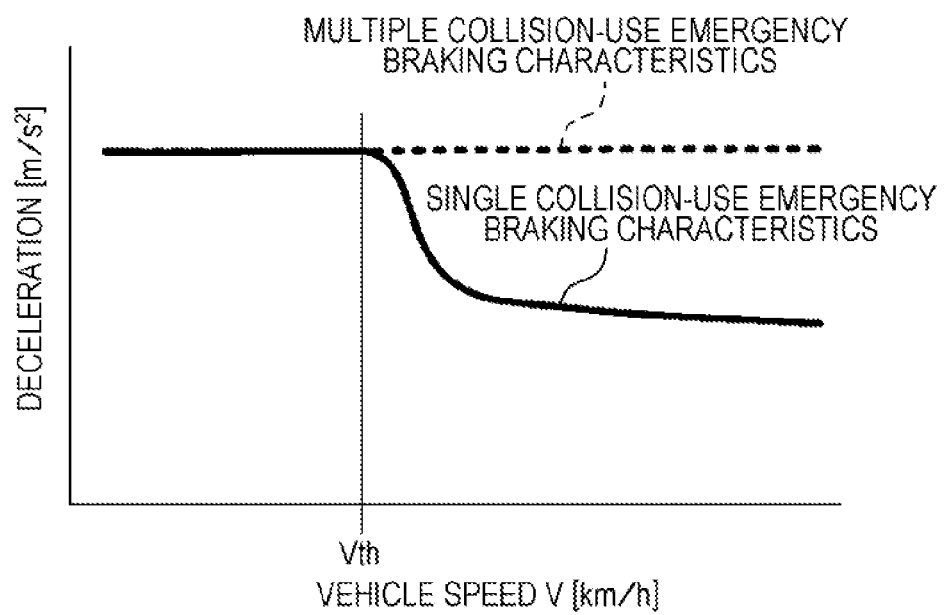
FIG. 4 is a graph of emergency braking characteristics, illustrating a comparison between single collision-use emergency braking characteristics employed when a vehicle has been involved in a single collision, and multiple collision-use emergency braking characteristics employed when a vehicle has been involved in multiple collisions.

Explanation of Action of the Vehicle Brake System 10, with Reference to Flowchart Next, explanation follows regarding action of the vehicle brake system 10 according to an embodiment of the present application, with reference to FIGS. 3A, 3B, and 4. FIGS. 3A and 3B are flowcharts to accompany explanation of action of the vehicle brake system 10. FIG. 4 is a graph of emergency braking characteristics, illustrating a comparison between single collision-use emergency braking characteristics employed when the vehicle has been involved in a single collision (solid line), and multiple collision-use emergency braking characteristics employed when the vehicle has been involved in a multiple collision (broken line).

At step S11 of FIG. 3A, the second data acquisition section 161 of the VSA-ECU 31 acquires various information, including data regarding the front-rear G and lateral G on the vehicle detected by the G sensor 153, and data regarding the vehicle speed detected by the vehicle speed sensor 123.

At step S12, the collision state determination section 163 of the VSA-ECU 31 determines whether or not the vehicle has been involved in a collision, based on the data regarding the front-rear G and lateral G acquired at step S11.

When the determination result at step S12 is determination that the vehicle has not been involved in a collision (step S12=No), the VSA-ECU 31 returns in the flow of processing to step S11, and the processing loop of the steps S11 to S12 is repeated until determination is made that the vehicle has been involved in a collision.

However, when the determination result at step S12 is determination that the vehicle has been involved in a collision (step S12=Yes), the VSA-ECU 31 advances in the flow of processing to time division parallel processing (to step S13 and a sub routine SUB regarding emergency braking processing). In the time division parallel processing, the VSA-ECU 31 performs the processing loop according to steps S13 to S15 (collision event count processing), and the processing loop according to sub routine SUB to step S16 (emergency braking processing), at practically the same time as each other.

At step S13, the collision state determination section 163 of the VSA-ECU 31 increments a collision event count value N recording the number of collision events by 1.

At step S14, the second data acquisition section 161 of the VSA-ECU 31 acquires various information including data regarding the front-rear G and the lateral G, and data regarding the vehicle speed.

At step S15, the collision state determination section 163 of the VSA-ECU 31 determines whether or not the vehicle has been involved in a collision, based on the data regarding the front-rear G and lateral G acquired at step S14.

When the determination result of step S15 is determination that the vehicle has not been involved in a collision (step S15=No), the VSA-ECU 31 returns in the flow of processing to step S14, and repeats the processing loop of steps S14 to S15 until determination is made that the vehicle has been involved in a collision.

However, when the determination result of step S15 is determination that the vehicle has been involved in a collision (step S15=Yes), the VSA-ECU 31 returns in the flow of processing to step S13, and repeats the subsequent collision event count processing.

At step S21 of the sub routine SUB illustrated in FIG. 3B, the collision state determination section 163 of the VSA-ECU 31 determines whether or not the vehicle has been involved in a multiple collision. More specifically, the collision state determination section 163 references the collision event count value N updated at step S13, and determines that a single collision has occurred when the collision event count value N is 1 (N=1), and determines that a multiple collision has occurred when the collision event count value N is 2 or greater (N≥2).

When the determination result at step S21 is determination that the vehicle has not been involved in a multiple collision (step S21=No), the VSA-ECU 31 advances in the flow of processing to the next step S22.

However, when the determination result at step S21 is determination that the vehicle has been involved in a multiple collision (step S21=Yes), the VSA-ECU 31 advances in the flow of processing to step S23.

At step S22, the second brake controller 167 of the VSA-ECU 31 selects, as the emergency braking characteristics employed when the vehicle has been involved in a single collision, single collision-use emergency braking characteristics represented by a relationship of recommended decelerations according to the change in vehicle speed V in a vehicle speed region exceeding a vehicle speed threshold value Vth (see the solid line in the graph of FIG. 4).

At step S23, the second brake controller 167 of the VSA-ECU 31 selects, as the emergency braking characteristics employed when the vehicle has been involved in a multiple collision, multiple collision-use emergency braking characteristics, in which, in a vehicle speed region exceeding the vehicle speed threshold value Vth, a relationship of the recommended decelerations according to the change in vehicle speed V has been increased compared to that of the single collision-use emergency braking characteristics (see the broken line in the graph of FIG. 4). In reality, as illustrated in FIG. 4, the multiple collision-use emergency braking characteristics represent characteristics in which a specific deceleration is maintained irrespective of the vehicle speed during a multiple collision.

At step S24, the second brake controller 167 of the VSA-ECU 31 performs, based on the emergency braking characteristics selected at step S22 or S23, control of braking on each of the wheels by using the brake fluid pressure adjustment function exhibited by the VSA system 18. Stated simply, when the vehicle has been involved in a single collision accident, the second brake controller 167 performs control of braking using the VSA system 18, based on the single collision-use emergency braking characteristics (see the solid line on the graph of FIG. 4).

However, when the vehicle has been involved in a multiple collision accident, the second brake controller 167 performs control of braking using the VSA system 18, based on the multiple collision-use emergency braking characteristics that maintain a specific deceleration irrespective of the vehicle speed during a multiple collision (see the broken line on the graph of FIG. 4).

Then the VSA-ECU 31 ends the sub routine SUB, and returns in the flow of processing to step S16 of the main routine.

At step S16, the VSA-ECU 31 determines whether or not conditions for stopping the emergency braking processing have been met. Conditions that may be adopted for stopping the emergency braking processing are, for example, that the vehicle has stopped moving (vehicle speed V=0 km/h), and that the monitoring period, starting at the point in time of the single collision (or maybe at the point in time the emergency braking started), has elapsed. This is because it is inferred that no problems will arise due to stopping the emergency braking processing after the stopping conditions have been met.

When the determination result at step S16 is determination that the conditions for stopping the emergency braking processing have not been met (the vehicle has not stopped, or the monitoring period that starts at the point in time of the single collision has not elapsed) (step S16=No), the VSA-ECU 31 returns in the flow of processing to the sub routine SUB for emergency braking processing, and repeats the processing loop of the sub routine SUB until determined that the conditions for stopping the emergency braking processing have been met.

However, when the determination result at step S16 is determination that the conditions for stopping the emergency braking processing have been met (the vehicle has stopped, and the monitoring period starting at the point in time of the single collision has elapsed) (step S16=Yes), the VSA-ECU 31 ends the parallel processing, and advances in the flow of processing to the next step S17.

At step S17, after stopping the emergency braking processing, the VSA-ECU 31 ends a cycle of the flow of processing.

Effects of the Vehicle Brake System 10 According to Embodiments of the Present Application Next, explanation follows regarding effects of the vehicle brake system 10 according to embodiments of the present application.

The vehicle brake system 10 based on a first aspect (corresponding to a first aspect of the embodiment) includes the collision state determination section 163 that determines the collision state of the vehicle, and the brake controller 167

(the second brake controller) that, when it has been determined by the collision state determination section 163 that the vehicle has collided, performs control of braking on the vehicle irrespective of braking operation by the driver.

When the collision state determination section 163 has determined that the vehicle has been involved in a multiple collision, the second brake controller 167 increases the braking control amount in this situation compared to the braking control amount during a single collision.

In the vehicle brake system 10 based on the first aspect, control of braking on the vehicle can be accurately accomplished due to increasing the braking control amount (deceleration in the example in FIG. 4) when the vehicle has been involved in a multiple collision, compared to the braking control amount during a single collision. As a result, the vehicle brake system 10 based on the first aspect can be expected to be effective in reducing or avoiding further collision damage after being involved in a multiple collision accident.

Since, in a single collision, there is a concern that a vehicle behind might run into the vehicle itself, it is generally surmised to be preferable to perform control of braking on the vehicle itself using a braking control amount according to the vehicle speed during a single collision. In contrast thereto, since deterioration in the detection precision for vehicle speed is assumed during a multiple collision, it is surmised to be preferable to perform control of braking on the vehicle itself during the multiple collision using a specific braking control amount, irrespective of the vehicle speed.

Thus the vehicle brake system 10 based on a second aspect employs a configuration that additionally includes the vehicle speed sensor 123 (vehicle speed detection section) that detects the vehicle speed of the vehicle itself. In this vehicle brake system 10, the brake controller 167 (the second brake controller) performs control of braking on the vehicle during a single collision using the braking control amount according to the vehicle speed during a single collision, but performs control of braking on the vehicle during a multiple collision using the specific braking control amount, irrespective of the vehicle speed during the multiple collision.

Due to being able to accurately accomplish control of braking on the vehicle when the vehicle has been involved in a multiple collision accident, the vehicle brake system 10 based on the second aspect can, similarly to the vehicle brake system 10 based on the first aspect, be expected to be effective in reducing or avoiding further collision damage after being involved in a multiple collision accident.

Other Embodiments

The plural embodiments explained above merely illustrate specific examples of the present application. Thus they should not be interpreted as limiting the technical scope of the present application. This is because various embodiments of the present application may be implemented without departing from the spirit of the present application, or from the main characteristics thereof.

For example, although explanation has been given of an example of the embodiment of the present application in which, when the vehicle has been involved in a multiple collision accident, the second brake controller 167 employs the multiple collision-use emergency braking characteristics that maintain a specific deceleration, irrespective of the vehicle speed during the multiple collision (see FIG. 4), and control of braking is performed by the VSA system 18 based on the multiple collision-use emergency braking characteristics, the present application is not limited to such an example.

A configuration also falling within the range of the technical scope of the present application is a configuration having a second brake controller 167 that, when the vehicle has been involved in a multiple collision accident, employs multiple collision-use emergency braking characteristics in which deceleration is variable according to the vehicle speed V during a multiple collision (however, in such cases the multiple collision-use emergency braking characteristics are increased in relation to the single collision-use emergency braking characteristics), and that performs control of braking using the VSA system 18 based on these multiple collision-use emergency braking characteristics.

Moreover, although explanation has been given of an example of an embodiment of the present application in which, when the vehicle has been involved in a multiple collision, the second brake controller 167 employs the multiple collision-use emergency braking characteristics that maintain a specific deceleration, irrespective of the number of events in a multiple collision (see FIG. 4), and performs control of braking using the VSA system 18 based on these multiple collision-use emergency braking characteristics, the present application is not limited to such an example.

A configuration also falling within the range of the technical scope of the present application is a configuration having a second brake controller 167 that, when the vehicle has been involved in a multiple collision accident, employs multiple collision-use emergency braking characteristics that increase deceleration as the number of events in a multiple collision increases (however, in such cases the multiple collision-use emergency braking characteristics are increased in relation to the single collision-use emergency braking characteristics), and that performs control of braking using the VSA system 18 based on these multiple collision-use emergency braking characteristics.

Finally, although explanation has been given of an example of an embodiment of the present application in which, when determined that the vehicle has been involved in a collision, the VSA-ECU 31 transitions the flow of processing to time division parallel processing (the collision event count processing and the emergency braking processing), the present application is not limited thereto. A configuration may be adopted that employs a VSA-ECU 31 including plural CPUs that act in cooperation which each other, and in which the collision event count processing and the emergency braking processing are executed on the respective plural CPUs.

What is claimed is:

1. A vehicle brake system for braking a vehicle, the vehicle brake system comprising:
   a collision state determination section configured to detect a collision state of a vehicle in which the vehicle is in a collision event and to determine whether the collision state is a single collision state that indicates a single collision event or is a multiple collision state that indicates multiple collision events; and
   a brake controller configured to start and control braking of the vehicle irrespective of driver's operation when the collision state determination section determines that the vehicle is in the collision event, the brake controller controlling a braking control amount for the braking, wherein
   when it is determined by the collision state determination section that the collision state is the multiple collision state during the collision event, the brake controller increases the braking control amount to decelerate the vehicle when the multiple collision events actually occur in comparison with a braking control amount when the collision state is the single collision state.

2. The vehicle brake system according to claim 1, further comprising:
a vehicle speed detection section that detects a speed of the vehicle, wherein
the brake controller is capable of controlling the braking control amount according to the vehicle speed detected by the vehicle speed detection section,
when it is determined that the collision state is the single collision state, the brake controller controls the braking control amount according to the vehicle speed detected during the single collision, and
when it is determined that the collision state is the multiple collision state, the brake controller does not control the braking control amount according to the vehicle speed.

3. The vehicle brake system according to claim 2, wherein, when it is determined that the collision state is the multiple collision state, the brake controller controls the braking control amount to be a predetermined amount irrespective of the vehicle speed.

* * * * *